United States Patent
Rawlinson

(10) Patent No.: US 9,120,389 B1
(45) Date of Patent: Sep. 1, 2015

(54) INTEGRATED MOTOR ASSEMBLY WITH COMPLIANTLY MOUNTED POWER INVERTER

(71) Applicant: Atieva, Inc., Redwood City, CA (US)

(72) Inventor: Peter Dore Rawlinson, Worcestershire (GB)

(73) Assignee: ATIEVA, INC., Menlo Park, CA (US)

( * ) Notice: Subject to any disclaimer, the term of this patent is extended or adjusted under 35 U.S.C. 154(b) by 99 days.

(21) Appl. No.: 14/176,053

(22) Filed: Feb. 8, 2014

(51) Int. Cl.
*B60L 11/18* (2006.01)

(52) U.S. Cl.
CPC .......... *B60L 11/1803* (2013.01); *Y10S 903/906* (2013.01)

(58) Field of Classification Search
CPC ............ B60L 11/1803; B60L 11/1805; B60L 11/1811; B60L 11/1812; B60L 15/007; Y10S 903/906
USPC ...................................................... 180/65.31
See application file for complete search history.

(56) References Cited

U.S. PATENT DOCUMENTS

| | | | | |
|---|---|---|---|---|
| 3,612,980 | A * | 10/1971 | King | 363/109 |
| 4,549,121 | A * | 10/1985 | Gale | 318/271 |
| 5,533,905 | A * | 7/1996 | Hio et al. | 439/76.2 |
| 6,099,325 | A * | 8/2000 | Parkhill | 439/76.1 |
| 6,166,498 | A * | 12/2000 | Yamaguchi et al. | 318/34 |
| 6,533,696 | B1 * | 3/2003 | Takenaka et al. | 475/150 |
| 6,619,933 | B2 * | 9/2003 | Ikeda | 417/410.1 |
| 6,907,947 | B2 * | 6/2005 | Morita et al. | 180/65.1 |
| 7,207,187 | B2 * | 4/2007 | Funahashi et al. | 62/228.4 |
| 7,610,973 | B2 * | 11/2009 | Asao et al. | 180/65.21 |
| 7,959,470 | B1 * | 6/2011 | Umetsu et al. | 439/626 |
| 8,618,419 | B2 * | 12/2013 | Fukasaku et al. | 174/152 GM |
| 2011/0180336 | A1 * | 7/2011 | Kurata | 180/65.1 |
| 2012/0153718 | A1 | 6/2012 | Rawlinson | |

\* cited by examiner

*Primary Examiner* — Paul N Dickson
*Assistant Examiner* — Bridget Avery
(74) *Attorney, Agent, or Firm* — Patent Law Office of David G. Beck

(57) ABSTRACT

An integrated drive assembly for an electric vehicle, where the power inverter enclosure is separate from the motor and the transmission, and where the power inverter enclosure is coupled to, and separated from, the motor via a plurality of inverter support members. Each of the inverter support members is rigidly coupled to the transmission enclosure and compliantly coupled to the power inverter enclosure using a plurality of flexible bushings.

15 Claims, 3 Drawing Sheets

INTEGRATED MOTOR ASSEMBLY WITH COMPLIANTLY MOUNTED POWER INVERTER

FIELD OF THE INVENTION

The present invention relates generally to electric motors and, more particularly, to an integrated motor assembly for use with an electric vehicle.

BACKGROUND OF THE INVENTION

In response to the demands of consumers who are driven both by ever-escalating fuel prices and the dire consequences of global warming, the automobile industry is slowly starting to embrace the need for ultra-low emission, high efficiency cars. While some within the industry are attempting to achieve these goals by engineering more efficient internal combustion engines, others are incorporating hybrid or all-electric drive trains into their vehicle line-ups. To meet consumer expectations, however, the automobile industry must not only achieve a greener drive train, but must do so while maintaining reasonable levels of performance, range, reliability, and cost.

The most common approach to achieving a low emission, high efficiency car is through the use of a hybrid drive train in which an internal combustion engine is combined with one or more electric motors. In general there are three types of hybrid drive trains: parallel hybrid, series-parallel hybrid, and series hybrid. In a parallel hybrid drive train, the power required to propel the vehicle may be provided by the internal combustion engine or the electric motor, either individually or together. In a series-parallel hybrid drive train, propulsive power is provided by both the internal combustion engine and the electric motor using a power splitter such as a planetary gear set. In a series hybrid drive train, propulsive power is only supplied by the electric motor and the internal combustion engine, which is coupled to a generator, is only used to charge the batteries as necessary.

While hybrid vehicles provide improved gas mileage and lower vehicle emissions, due to their inclusion of an internal combustion engine they still suffer from many of the inherent limitations of such a power source. For example, during operation the vehicle still emits harmful pollution, albeit at a reduced level compared to a conventional vehicle. Additionally, due to the inclusion of both an internal combustion engine and an electric motor(s) with its accompanying battery pack, the drive train of a hybrid vehicle is typically much more complex, resulting in increased cost and weight. Accordingly, several vehicle manufacturers are designing vehicles that only utilize an electric motor, or multiple electric motors, thereby eliminating one source of pollution while significantly reducing drive train complexity. The present invention provides an improved drive system for such a vehicle.

SUMMARY OF THE INVENTION

The present invention provides an integrated drive assembly for an electric vehicle, where the power inverter enclosure is separate from the motor and the transmission, and where the power inverter enclosure is coupled to, and separated from, the motor via a plurality of inverter support members. A first portion of each of the inverter support members is rigidly coupled to the transmission enclosure while a second portion of each of the inverter support members is compliantly coupled to the power inverter enclosure using flexible bushings (e.g., rubber or synthetic bushings). The electric motor and the transmission may utilize a single, multi-piece enclosure separate from the power inverter enclosure. The inverter support members may be fabricated as transmission enclosure extensions that project from the transmission enclosure, or they may be distinct and fabricated separately from the transmission enclosure and rigidly coupled to the transmission enclosure using bolts, weld joints, braze joints, or other means. The inverter support members may be fabricated from a metal (e.g., steel, aluminum, etc.) or from a composite. The transmission may be a single speed, fixed gear transmission, and may be coupled to first and second drive half shafts.

A further understanding of the nature and advantages of the present invention may be realized by reference to the remaining portions of the specification and the drawings.

DESCRIPTION OF THE SPECIFIC EMBODIMENTS

In most electric vehicles (i.e., EVs), regardless of whether the EV is an all-electric vehicle, a plug-in hybrid vehicle, also referred to as a PHEV, or a hybrid vehicle, also referred to as a HEV, the motor and the power inverter are maintained as discrete components mounted within separate housings and typically mounted in completely different regions of the vehicle. In at least one alternative configuration, however, a single, multi-piece enclosure is used to house both the electric motor and the power inverter, where the motor and inverter are each rigidly coupled to an interposed transmission.

While integrating the motor, transmission and power inverter into a single housing shortens the electrical connection between the power inverter and the motor and may also simplify system cooling, the present inventor has found that using separate housings for the inverter and the motor and coupling those separate housings together using a compliant mounting scheme provides distinct advantages. In particular, a compliant mounting scheme utilizing flexible mounting bushings allows the mass of the power inverter to absorb and damp out undesirable rotational oscillations caused by the motor, especially when the motor is undergoing strong acceleration or deceleration. Absorbing and damping out such oscillations improves component life while reducing the magnitude of noise and vibration transferred from the drive train to the passenger cabin, thereby providing a smoother ride with increased passenger comfort and driver control.

Figure 1:
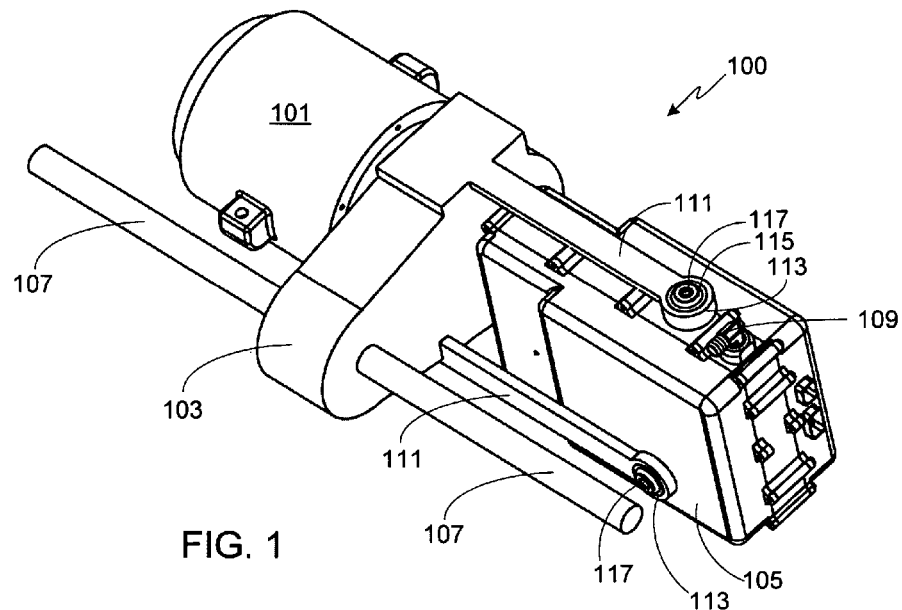
FIG. 1 provides a perspective view of an assembly using three support members to compliantly mount the inverter to the motor-transmission assembly.
Figure 2:
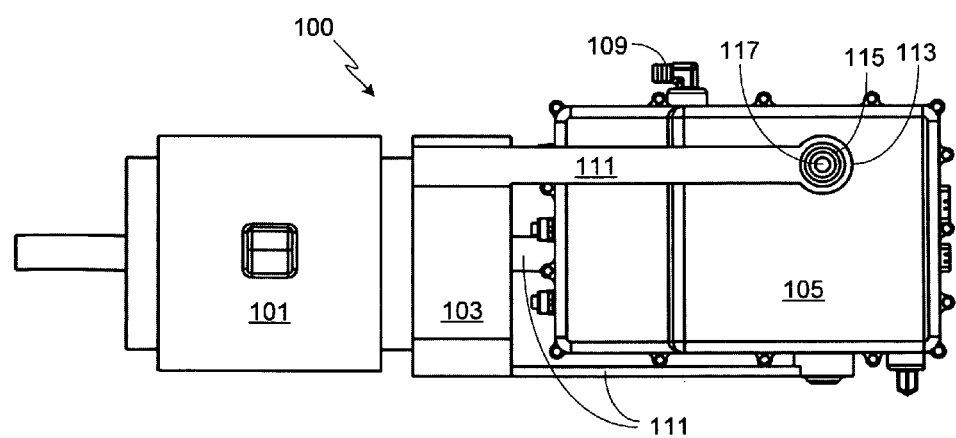
FIG. 2 provides a side view of the motor-inverter assembly shown in FIG. 1.
Figure 3:
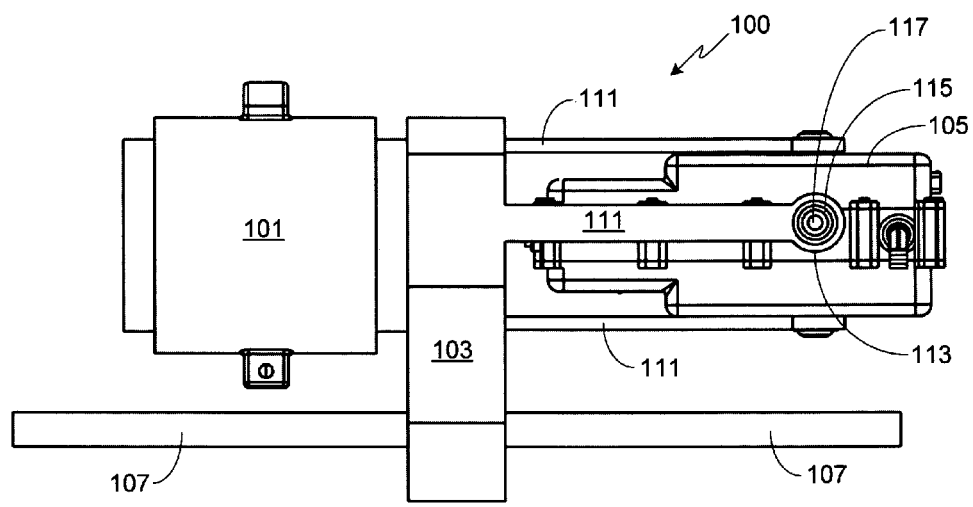
FIG. 3 provides a top view of the motor-inverter assembly shown in FIGS. 1 and 2.

FIGS. 1-3 illustrate a preferred embodiment of a motor-inverter assembly 100 in accordance with the invention. FIG. 1 provides a perspective view of assembly 100 while FIGS. 2 and 3 provide side and top views, respectively, of the same assembly. Visible in FIG. 1 is motor 101, transmission 103 and inverter 105. Preferably motor 101 is a three phase alternating current (i.e., AC) motor. Motor 101 is coupled to the vehicle's drive shaft, and preferably to a pair of drive half-shafts 107 as shown, via transmission 103. Transmission 103 may be a single speed, fixed gear transmission or a multi-speed (e.g., two speed) transmission. Inverter 105 converts the direct current (i.e., DC) power from the vehicle's batteries, not shown, to match the power requirements of motor 101 which, as noted above, is preferably comprised of an AC motor. To simplify the figures and insure clarity, the electrical connections between inverter 105 and the battery pack and between inverter 105 and motor 101 are not shown. Similarly, the cooling conduits used to couple the drive system to a cooling system are not shown, although a coolant inlet 109 is visible in FIG. 1.

Extending from transmission enclosure 103 are three inverter support members 111. As shown, support members 111 hold the inverter enclosure out and away from the transmission and motor assembly enclosure. Support members 111 may be fabricated as part of the transmission enclosure as shown. Alternately, support members 111 may be distinct and separately fabricated members that are attached to the transmission enclosure by bolting, welding, brazing or other means. In the preferred embodiment support members 111 are fabricated from aluminum, although other metals (e.g., steel) and non-metals (e.g., composites) may be used. At or near the end of each support member 111 is a bushing collar 113 that holds a rubber or synthetic bushing 115. The bushing/collar assembly of each support member is bolted to inverter enclosure 105 with bolt 117.

Figure 4:
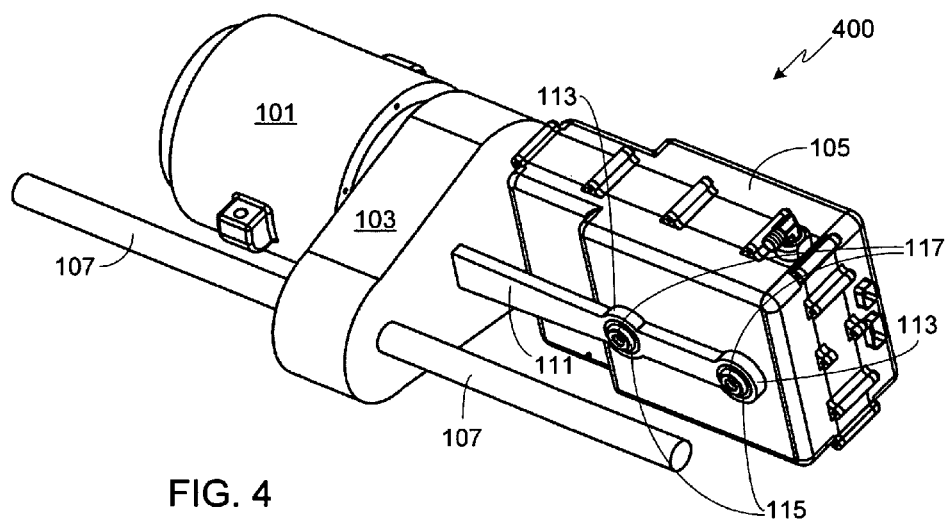
FIG. 4 provides a perspective view of an assembly using two support members to compliantly mount the inverter to the motor-transmission assembly.
Figure 5:
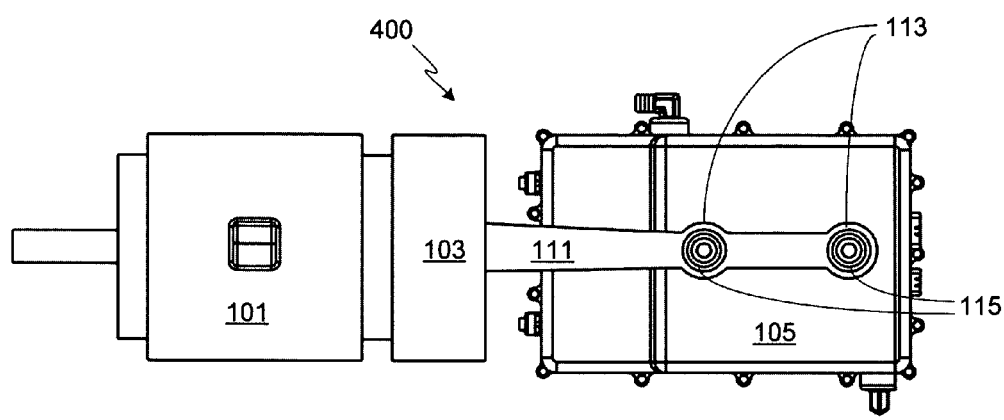
FIG. 5 provides a side view of the motor-inverter assembly shown in FIG. 4.
Figure 6:
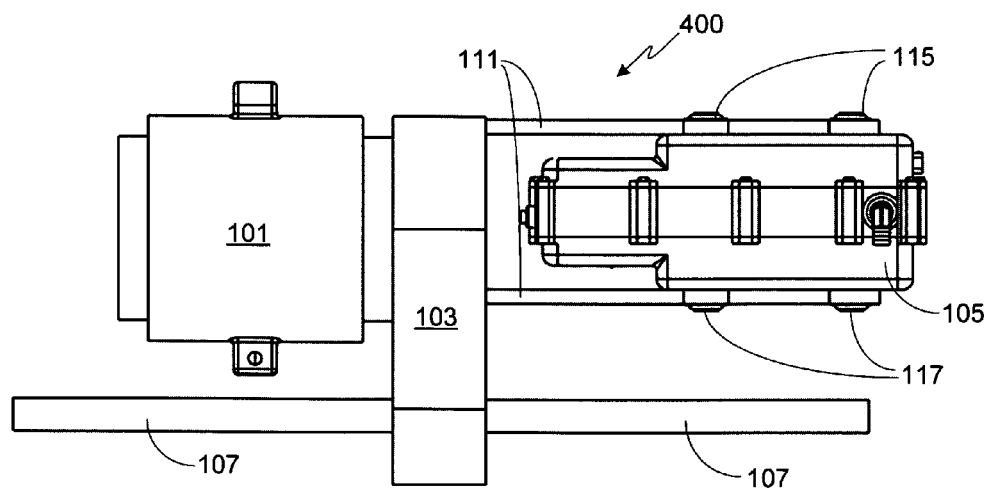
FIG. 6 provides a top view of the motor-inverter assembly shown in FIGS. 4 and 5.

FIGS. 4-6 illustrate an alternate embodiment. In general, assembly 400 is the same as assembly 100 except that inverter 105 is compliantly coupled to the transmission housing with two, rather than three, inverter support members 111 and each support member 111 is bolted to the inverter with two bushing assemblies as shown.

One of the benefits of the disclosed approach is that it allows the assembly to be tuned, as necessary, for example in order to remove specific harmonics. In the initial design stage, the degree to which inverter 105 is allowed to move relative to the motor/transmission assembly may be tuned by selecting the number of support members 111 e.g., two as in assembly 400, three as in assembly 100, or more), the choice of support member material (e.g., aluminum versus steel versus a composite, etc.), the dimensions of each support member 111 (e.g., thickness and width), the separation distance between the motor-transmission housing and the inverter (i.e., the length of each support member 111), and the number and location of the bushing assemblies used to mount inverter 105 to the support members 111 (e.g., one bushing assembly per support member as shown in assembly 100 versus two bushing assemblies per support member as shown in assembly 400 versus more than two bushing assemblies). During assembly, further tuning can be achieved based on the material characteristics of the selected bushings (e.g., rubber versus synthetic, bushing material density, etc.).

The configurations shown in FIGS. 1-6 in which the motor is mounted on one side of the vehicle's longitudinal centerline and the inverter is mounted on the other side of the centerline are optimized to achieve a balanced weight distribution. It should be understood that other configurations may be used and as such, in some configurations it may be preferable to extend the inverter support members from the motor enclosure rather than the transmission enclosure as shown. In such a configuration, instead of interposing the transmission between the motor and inverter, the transmission would be mounted to one side of the motor and the inverter would be compliantly mounted using support members 111 to the other side of the motor.

It should be understood that the accompanying figures are only meant to illustrate, not limit, the scope of the invention and should not be considered to be to scale.

Systems and methods have been described in general terms as an aid to understanding details of the invention. In some instances, well-known structures, materials, and/or operations have not been specifically shown or described in detail to avoid obscuring aspects of the invention. In other instances, specific details have been given in order to provide a thorough understanding of the invention. One skilled in the relevant art will recognize that the invention may be embodied in other specific forms, for example to adapt to a particular system or apparatus or situation or material or component, without departing from the spirit or essential characteristics thereof. Therefore the disclosures and descriptions herein are intended to be illustrative, but not limiting, of the scope of the invention.

What is claimed is:

1. An integrated drive assembly of an electric vehicle, comprising:
    an electric motor disposed within an electric motor enclosure;
    a power inverter disposed within a power inverter enclosure, said power inverter configured to convert DC current supplied by a battery pack to AC current capable of operating said electric motor;
    a transmission disposed within a transmission enclosure, wherein said transmission is coupled to said electric motor and coupled to a drive shaft, wherein said electric motor provides propulsive power to said electric vehicle; and
    a plurality of inverter support members, wherein a first end portion of each of said plurality of inverter support members is rigidly coupled to said transmission enclosure, and wherein a second end portion of each of said plurality of inverter support members is compliantly coupled to said power inverter enclosure using a plurality of flexible bushings, and wherein said plurality of inverter support members maintains said power inverter enclosure at a distance from said transmission enclosure.

2. The integrated drive assembly of claim 1, wherein said electric motor enclosure and said transmission enclosure are combined into a single, multi-piece enclosure, and wherein said power inverter enclosure is separate from said single, multi-piece enclosure.

3. The integrated drive assembly of claim 1, wherein each of said plurality of inverter support members is fabricated as an extension that projects from said transmission enclosure.

4. The integrated drive assembly of claim 1, wherein each of said plurality of inverter support members is distinct and separately fabricated from said transmission enclosure.

5. The integrated drive assembly of claim 1, wherein said plurality of bushings are fabricated from a rubber.

6. The integrated drive assembly of claim 1, wherein said plurality of bushings are fabricated from a synthetic material.

7. The integrated drive assembly of claim 1, wherein said plurality of inverter support members are fabricated from a metal selected from the group consisting of aluminum and steel.

8. The integrated drive assembly of claim 1, wherein said plurality of inverter support members are fabricated from a composite.

9. The integrated drive assembly of claim 1, wherein said transmission is a single speed, fixed gear transmission.

10. The integrated drive assembly of claim 1, wherein said transmission is coupled to a first drive half shaft and a second drive half shaft.

11. The integrated drive assembly of claim 1, wherein said plurality of inverter support members consist of three inverter support members, and wherein each of said three inverter support members is compliantly coupled to each of three sides of said power inverter enclosure.

12. The integrated drive assembly of claim 1, wherein said plurality of inverter support members consist of two inverter support members, and wherein each of said two inverter support members is compliantly coupled to each of two opposing sides of said power inverter enclosure.

13. The integrated drive assembly of claim 4, wherein said first end portion corresponding to each of said plurality of inverter support members is bolted to said transmission enclosure.

14. The integrated drive assembly of claim 4, wherein said first end portion corresponding to each of said plurality of inverter support members is welded to said transmission enclosure.

15. The integrated drive assembly of claim 4, wherein said first end portion corresponding to each of said plurality of inverter support members is brazed to said transmission enclosure.

* * * * *